United States Patent
Snyder, Jr. et al.

(10) Patent No.: US 7,982,463 B2
(45) Date of Patent: Jul. 19, 2011

(54) EXTERNALLY GUIDED AND DIRECTED FIELD INDUCTION RESISTIVITY TOOL

(75) Inventors: Harold L. Snyder, Jr., Rockwell, TX (US); Paula Turner, Pleasant Grove, UT (US)

(73) Assignee: Schlumberger Technology Corporation, Houston, TX (US)

( * ) Notice: Subject to any disclaimer, the term of this patent is extended or adjusted under 35 U.S.C. 154(b) by 635 days.

(21) Appl. No.: 12/041,754

(22) Filed: Mar. 4, 2008

(65) Prior Publication Data

US 2008/0265892 A1 Oct. 30, 2008

Related U.S. Application Data

(63) Continuation of application No. 11/776,447, filed on Jul. 11, 2007, now Pat. No. 7,598,742.

(60) Provisional application No. 60/914,619, filed on Apr. 27, 2007, now abandoned.

(51) Int. Cl.
*G01V 3/28* (2006.01)
*G01V 3/10* (2006.01)
*G01V 3/18* (2006.01)

(52) U.S. Cl. ........................ 324/339; 324/333

(58) Field of Classification Search .................. 324/339, 324/351–352, 354–357, 366–367, 369, 373–375, 324/333
See application file for complete search history.

(56) References Cited

U.S. PATENT DOCUMENTS

| | | | |
|---|---|---|---|
| 4,278,556 A | 7/1981 | Tada | |
| 4,302,722 A | 11/1981 | Gianzero | |
| 4,536,714 A | 8/1985 | Clark | |
| 4,766,384 A | 8/1988 | Kleinberg | |
| 4,785,247 A | 11/1988 | Meador et al. | |
| 4,808,929 A | 2/1989 | Oldigs | |
| 4,839,644 A | 6/1989 | Safinya et al. | |
| 4,881,988 A | 11/1989 | Bonser | |
| 4,933,640 A | 6/1990 | Kuckes | |
| 4,980,643 A | 12/1990 | Gianzero | |
| 5,045,795 A | 9/1991 | Gianzero et al. | |
| 5,081,419 A | 1/1992 | Meador | |
| 5,089,779 A | 2/1992 | Rorden | |
| 5,095,272 A | 3/1992 | Sinclair | |
| 5,138,263 A | 8/1992 | Towle | |
| 5,428,293 A | 6/1995 | Sinclair et al. | |
| 5,442,294 A | 8/1995 | Rorden | |
| 5,448,227 A | 9/1995 | Orban et al. | |
| 5,491,488 A | 2/1996 | Wu | |
| 5,530,358 A | 6/1996 | Wisler | |
| 5,594,343 A | 1/1997 | Clark et al. | |
| 5,606,260 A | 2/1997 | Giordano et al. | |
| 5,668,475 A | 9/1997 | Orban et al. | |
| 5,905,379 A | 5/1999 | Orban et al. | |
| 6,068,394 A | 5/2000 | Dublin | |
| 6,100,696 A | 8/2000 | Sinclair | |
| 6,114,972 A | 9/2000 | Smith | |

(Continued)

*Primary Examiner* — Bot L LeDynh
(74) *Attorney, Agent, or Firm* — Holme Roberts & Owen LLC

(57) ABSTRACT

In one aspect an induction resistivity tool incorporated into a downhole tool string comprises an outer wall of a downhole component comprising an outer diameter and at least one induction transmitter assembly disposed along the outer diameter. The at least one transmitter assembly comprises at least one induction transmitter coil wound about at least one core. The at least one transmitter coil is adapted to project an induction signal outward from the outer wall when the at least one transmitter coil is carrying an electrical current. The transmitter assembly is adapted to create electromagnetic fields that originate the induction signal from outside the outer wall and substantially prevent the signal from entering the outer wall.

18 Claims, 9 Drawing Sheets

U.S. PATENT DOCUMENTS

| | | | |
|---|---|---|---|
| 6,163,155 A | 12/2000 | Bittar | |
| 6,191,586 B1 | 2/2001 | Bittar | |
| 6,218,842 B1 | 4/2001 | Bittar et al. | |
| 6,259,030 B1 | 7/2001 | Tanigawa et al. | |
| 6,285,014 B1 | 9/2001 | Beck | |
| 6,297,639 B1 | 10/2001 | Clark | |
| 6,344,746 B1 | 2/2002 | Chunduru et al. | |
| 6,359,438 B1 | 3/2002 | Bittar | |
| 6,476,609 B1 | 11/2002 | Bittar | |
| 6,538,447 B2 | 3/2003 | Bittar | |
| 6,577,129 B1 | 6/2003 | Thompson et al. | |
| 6,586,939 B1 | 7/2003 | Fanini et al. | |
| 6,630,831 B2 * | 10/2003 | Amini | 324/339 |
| 6,641,434 B2 | 11/2003 | Boyle et al. | |
| 6,646,441 B2 | 11/2003 | Thompson et al. | |
| 6,667,620 B2 | 12/2003 | Homan | |
| 6,670,880 B1 | 12/2003 | Hall et al. | |
| 6,677,756 B2 | 1/2004 | Fanini et al. | |
| 6,680,613 B2 | 1/2004 | Rosthal | |
| 6,688,396 B2 | 2/2004 | Floerke et al. | |
| 6,690,170 B2 | 2/2004 | Homan et al. | |
| 6,703,837 B1 | 3/2004 | Wisler et al. | |
| 6,765,385 B2 | 7/2004 | Sinclair et al. | |
| 6,768,407 B2 | 7/2004 | Kohda et al. | |
| 6,768,700 B2 | 7/2004 | Veneruso et al. | |
| 6,777,940 B2 | 8/2004 | Macune | |
| 6,810,331 B2 | 10/2004 | Bittar et al. | |
| 6,814,162 B2 | 11/2004 | Moran et al. | |
| 6,849,195 B2 | 2/2005 | Basheer et al. | |
| 6,900,640 B2 | 5/2005 | Fanini | |
| 6,913,095 B2 | 7/2005 | Krueger et al. | |
| 6,915,701 B1 | 7/2005 | Tarler | |
| 6,975,243 B2 | 12/2005 | Clark et al. | |
| 7,031,839 B2 | 4/2006 | Tabarovsky et al. | |
| 7,038,457 B2 | 5/2006 | Chen et al. | |
| 7,040,003 B2 | 5/2006 | Hall et al. | |
| 7,046,009 B2 | 5/2006 | Itskovich | |
| 7,057,392 B2 | 6/2006 | Wang et al. | |
| 7,064,676 B2 | 6/2006 | Hall et al. | |
| 7,091,810 B2 | 8/2006 | Hall et al. | |
| 7,095,232 B2 | 8/2006 | Haber et al. | |
| 7,098,657 B2 | 8/2006 | Guilhamat et al. | |
| 7,098,858 B2 | 8/2006 | Bittar et al. | |
| 7,116,199 B2 | 10/2006 | Hall et al. | |
| 7,138,803 B2 | 11/2006 | Bittar | |
| 7,138,897 B2 | 11/2006 | Minerbo | |
| 7,141,981 B2 | 11/2006 | Folberth et al. | |
| 7,150,316 B2 | 12/2006 | Itskovich | |
| 7,193,420 B2 | 3/2007 | Chen | |
| 7,212,132 B2 | 5/2007 | Gao et al. | |
| 7,265,649 B1 | 9/2007 | Hall et al. | |
| 7,301,429 B1 | 11/2007 | Hall et al. | |
| 7,360,610 B2 | 4/2008 | Hall et al. | |
| 7,477,114 B2 | 1/2009 | Pivit et al. | |
| 7,598,742 B2 | 10/2009 | Synder et al. | |
| 7,730,972 B2 | 6/2010 | Hall et al. | |
| 2006/0208383 A1 | 9/2006 | Aisenbrey | |

* cited by examiner

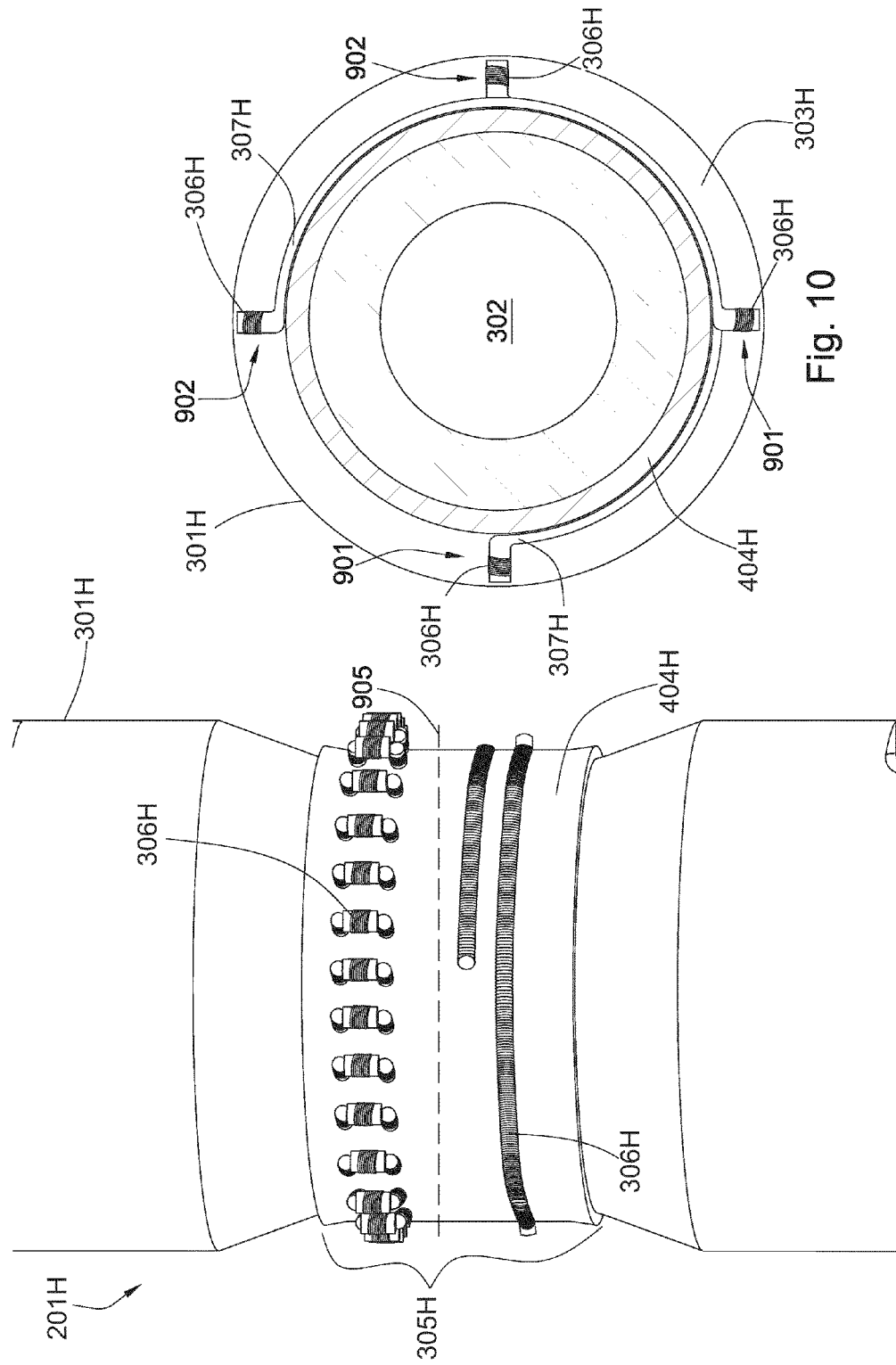

EXTERNALLY GUIDED AND DIRECTED FIELD INDUCTION RESISTIVITY TOOL

CROSS REFERENCE TO RELATED APPLICATIONS

This application is a continuation of U.S. patent application Ser. No. 11/776,447, filed on Jul. 11, 2007, now U.S. Pat. No. 7,598,742, which claims the benefit of U.S. Provisional Patent Application No. 60/914,619, filed on Apr. 27, 2007, now abandoned. Both of these applications are herein incorporated by reference for all that they contain.

BACKGROUND OF THE INVENTION

For the past several decades, engineers have worked to develop apparatus and methods to effectively obtain information about downhole formations. This is especially beneficial during the process of drilling and following this process and is accomplished using wireline methods or pushed tool methods for use in horizontal wells. All of these methods are collectively referred to in the industry as logging.

During the drilling process and, with time afterward, drilling fluids begin to flush and intermingle with the natural fluids in the formation forming an invasion zone near the drilled borehole. This fluid exchange increases with time and the formation wall can degrade or become damaged with further drilling operations which can mask or alter information about the formation that is of interest.

Logging-while-drilling (LWD) refers to a set of processes commonly used by the industry to obtain information about a formation near the drill bit during the drilling process in order to transmit the information from logging tools or components located downhole on oil and gas drilling strings to the ground's surface. Measurement-while drilling (MWD) refers to a method of LWD that will store part of the information obtained by the logging tools and transmit the remaining information to the surface or store all of the information collected during drilling for later retrieval and download into surface electronics. LWD methods are also used in smart drilling systems to aid or direct the drilling operations and in some cases to maintain the drill in a specific zone of interest. The terms MWD and LWD are often used interchangeably in the industry and LWD will be used here to refer to both methods with the understanding that the LWD encompasses systems that collect formation, angular rotation rate and depth information and store this information for later retrieval and/or transmission of this information to the surface while drilling.

A common sensor used in logging systems is for the measurement of resistivity or its complement, conductivity. The resistivity of the formation is often measured at different depths into the formation to determine the amount of fluid invasion and aid in the calculation of true formation resistivity. The formation resistivity is most often used with other sensors in an analysis to determine many other formation parameters. There are various types of resistivity sensors including direct current (DC) focused resistivity which utilizes one or more electrodes devices, alternating current (AC) focused resistivity which utilizes one or more electrodes devices, AC scanned resistivity which measures in a specific circumferential or angular pattern around the borehole, and a fourth type called induction or propagation resistivity which also utilizes AC methods. Induction resistivity sensors generally use lower frequencies, below 100 KHz, while propagation sensors use higher frequencies. The terms induction sensor or induction tool will be used interchangeably herein and will refer to both induction and propagation resistivity methods.

Induction tools with varying number and combinations of transmitter(s) and receiver(s) with varying separation distances and operating frequencies have been used to explore formations at various depths of investigation. The prior art includes the following references to resistivity tools and resistivity logging, each having a common design problem in that they either allow the transmitted field to penetrate the induction tool or, if a shield is utilized, do not actively direct the field away from electrical and magnetic tool surfaces and materials.

U.S. Pat. No. 6,677,756 to Fanini et al., which is herein incorporated by reference for all that it contains, discloses an induction tool for formation resistivity evaluations. The tool provides electromagnetic transmitters and sensors suitable for transmitting and receiving magnetic fields in radial directions.

U.S. Pat. No. 6,359,438 to Bittar, which is herein incorporated by reference for all that it contains, discloses a resistivity tool for use in an LWD system that includes a transmitter array with multiple transmitters positioned above a pair of receivers. The transmitters are selectively energized, causing current to be induced in the collar of the tool.

U.S. Pat. No. 6,577,129 to Thompson et al., which is herein incorporated by reference for all that it contains, discloses an electromagnetic wave propagation resistivity borehole logging system having multiple groups of electromagnetic transmitter-receiver arrays operating at three frequencies.

U.S. Pat. No. 6,538,447 to Bittar, which is herein incorporated by reference for all that it contains, discloses a multimode resistivity tool for use in a logging-while-drilling system that includes an asymmetric transmitter design with multiple transmitters capable of generating electromagnetic signals at multiple depths of investigation.

U.S. Pat. No. 7,141,981 to Folbert et al., which is herein incorporated by reference for all that it contains, discloses a resistivity logging tool suitable for downhole use that includes a transmitter, and two spaced apart receivers. The measured resistivities at the two receivers are corrected based on measuring the responses of the receivers to a calibration signal.

U.S. Pat. No. 6,218,842 to Bittar et al., which is herein incorporated by reference for all that it contains, discloses a resistivity tool for use in LWD systems that includes an asymmetric transmitter design with multiple transmitters capable of generating electromagnetic signals at multiple frequencies.

U.S. Pat. No. 5,045,795 to Gianzero et al., which is herein incorporated by reference for all that it contains, discloses a coil array which is installed on a MWD drill collar for use in a resistivity logging system The drill collar is provided with upper and lower coil support rings. The coil support rings are toroids which support individual coil segments, and are connected by suitable magnetic shorting bars. The coil segments and shorting bars inscribe a specified solid angle or azimuthal extent.

U.S. Pat. No. 5,606,260 to Giordano et al., which is herein incorporated by reference for all that it contains, discloses a microdevice that is provided for measuring the electromagnetic characteristics of a medium in a borehole. The microdevice includes at least one emitting or transmitting coil (31), and at least one receiving coil (41,51). The microdevice generates an AC voltage at the terminals of the transmitting coil and measures a signal at the terminals of the receiving coil. The microdevice also includes an E-shaped electrically insulating, soft magnetic material circuit serving as a support for each of the coils and which is positioned adjacent to the medium in the borehole.

U.S. Pat. No. 6,100,696 to Sinclair, which is herein incorporated by reference for all that it contains, discloses a directional induction logging tool that is provided for measurement while drilling. This tool is preferably placed in a side pocket of a drill collar, and it comprises transmitter and receiver coils and an electromagnetic reflector.

U.S. Pat. No. 6,163,155 to Bittar et al., which is herein incorporated by reference for all that it contains, discloses a downhole method and apparatus for simultaneously determining the horizontal resistivity, vertical resistivity, and relative dip angle for anisotropic earth formations.

U.S. Pat. No. 6,476,609 to Bittar et al., which is herein incorporated by reference for all that it contains, discloses an antenna configuration in which a transmitter antenna and a receiver antenna are oriented in nonparallel planes such that the vertical resistivity and the relative dip angle are decoupled.

U.S. patent application Ser. No. 11/676,494 to Hall et al., which is herein incorporated by reference for all that it contains, discloses an induction resistivity tool comprising a flexible ring of magnetically conducting material disposed intermediate an induction coil and a surface of an annular recess.

U.S. patent application Ser. No. 11/687,891 to Hall et al., which is herein incorporated by reference for all that it contains, discloses a resistivity tool comprising an actuator in a downhole component that is adapted to put an electrically conductive element into and out of electrical contact with at least one electrically insulated induction coil and thereby change an optimal signal frequency of the at least one coil.

FIELD OF THE INVENTION

The present invention relates to a measurement procedure used to assess and aid in the recovery of petroleum, gas, geothermal and other minerals and resources. And more particularly, this invention relates to the field of induction resistivity tools for tool strings employed in such exploration. The present invention generally relates to a well logging tool with one or more transmitters and one or more receivers that measure the resistivity and other formation parameters adjacent to the wellbore. More particularly, the present invention relates to a method of generating, directing and shielding a field adjacent to an electrically conductive structure with a minimum of interference from the electrical or magnetic properties of the structure that would alter, distort or minimize the generated field. The invention applies to MWD/LWD tools, pad-on-arm based tools and pushed tools for use in vertical to horizontal well bores.

BRIEF SUMMARY OF THE INVENTION

The embodiment of the invention includes a configuration of windings, coils or antenna that generates, and actively guides and directs a field in a path external to and away from an electrically conductive structure with some magnetic properties.

In a padded, pushed or LWD induction resistivity tool, an embodiment of a single transmitter element may be a winding, coil or antenna that generates a field parallel to the long axis of the metal drill collar or mandrel such that the field can be guided and directed away from the collar or mandrel. The transmitter element may include one or more windings, coil or antenna, herein referred to as bucking coils, positioned in such a manner as to aid in directing the field away from the collar or mandrel. The transmitter element may utilize insulating, electrical and magnetic materials to guide the field to minimize the influence of the metal collar or mandrel. A single or plurality of transmitter elements are placed either partially or completely circumferentially around the perimeter of the collar or mandrel at any angle to form a single transmitter. In padded embodiments, one or more transmitter elements may be utilized. Complete, partial or padded implementations of the transmitter element allow the system to preferentially measure only a small angular area of the formation for detailed analysis, smart tool or automatic/manual directional drilling applications.

In a padded, pushed or LWD induction resistivity tool, an embodiment of a single receiver element is a winding, coil or antenna that detects the generated field with a minimum of interference from the collar or mandrel. The receiver element may utilize insulating, electrical and magnetic materials to guide and direct the field to minimize the influence of the collar or mandrel. A single or plurality of receiver elements may be placed either partially or completely circumferentially around the perimeter of the collar or mandrel at any angle to form a single receiver. In padded embodiments, one or more receiver elements may be utilized and oriented in any direction. Partial or padded implementations of the receiver element allow the system to preferentially measure only a small angular area of the formation for detailed analysis or smart tool applications.

Any number of transmitters and receivers can be used to obtain a given depth of investigation into the formation and a given vertical field or bed resolution.

The plurality of transmitter, receiver and bucking windings, coils or antenna may be electrically connected in parallel or in series. One or more of the plurality of transmitters may be adapted to switch between a series and parallel connection with another of the plurality of transmitters.

The induction transmitter assembly may be disposed within one or more radial recesses disposed in the outer diameter of the outer wall of the collar or mandrel. The recesses may be horizontal, perpendicular to the long axis of the collar or mandrel or at any angle.

The resistivity tool may be in communication with a downhole network. The resistivity tool may be incorporated into a bottom hole assembly. The at least one induction transmitter assembly is tilted with respect to the downhole tool string.

BRIEF DESCRIPTION OF THE DRAWINGS

FIG. 9 is a perspective diagram of another embodiment of an induction transmitter assembly disposed in an annular radial recess.

FIG. 10 is a cross-sectional diagram of another embodiment of an induction transmitter assembly disposed in an annular radial recess.

DETAILED DESCRIPTION

Figure 1:
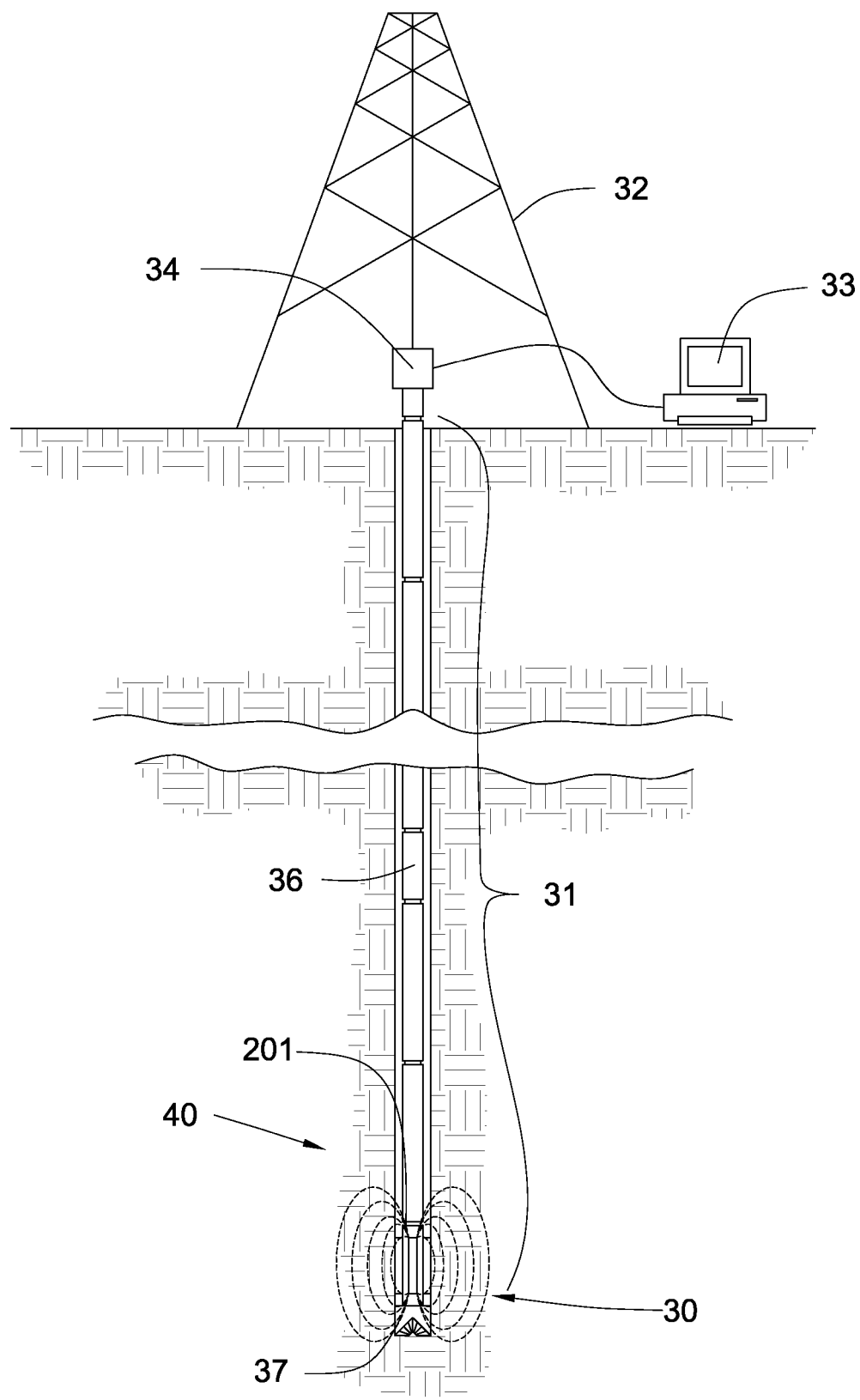
FIG. 1 is a cross-sectional diagram of a well hole showing an embodiment of a downhole tool string.

Referring now to FIG. 1, a downhole tool string 31 suspended by a derrick 32. The tool string comprises one or more downhole components 36, linked together in the downhole tool string 31 and in communication with surface equipment 33 through a downhole network. Having a network in the downhole tool string 31 enables high-speed communication between each device connected to the network and facilitates the transmission and receipt of data between sensors, energy sources, and energy receivers. The downhole tool string 31 is depicted in a vertical drilled hole but it may be at any angle including horizontal.

Either the downhole tool string 31, surface equipment 33, or both have an energy source or multiple energy sources. The energy source transmits electrical current to one or more downhole components 36 on a bottom hole assembly 37 or along the downhole tool string 31.

In some embodiments of the invention, one or more downhole component 36 may include sensors. These sensors may sense gamma rays, radioactive energy, resistivity, torque, pressure, or other drilling dynamics measurements or combinations thereof from the formation being drilled. Any combination of downhole components 36 in a downhole tool string 31 may be compatible with the present invention.

Data may be transmitted along the downhole tool string 31 through techniques known in the art. A preferred method of downhole data transmission using inductive couplers disposed in tool joints is disclosed in the U.S. Pat. No. 6,670,880 to Hall et al., which is herein incorporated by reference for all it discloses.

An alternate data transmission path may have direct electrical contacts in tool joints such as in the system disclosed in U.S. Pat. No. 6,688,396 to Floerke et al., which is herein incorporated by reference for all that it discloses.

Another data transmission system that may also be adapted for use with the present invention is disclosed in U.S. Pat. No. 6,641,434 to Boyle et al., which is also herein incorporated by reference for all that it discloses.

In some embodiments of the present invention, alternative forms of telemetry may be used to communicate with the downhole components 36, such as telemetry systems that communicate through the drilling mud or through the earth. Such telemetry systems may use electromagnetic or acoustic waves. The alternative forms of telemetry may be the primary telemetry system for communication with the tool string 31 or they may be back-up systems designed to maintain some communication if the primary telemetry system fails.

A data swivel 34 or a wireless top-hole data connection may facilitate the transfer of data between components 36 of the downhole tool string 31 and the stationary surface equipment, such as a control module 33.

Preferably the downhole tool string 31 is a drill string. In other embodiments the downhole tool string 31 is part of a coiled tubing logging system or part of a production well. In the present embodiment, an embodiment of a resistivity tool 201 in accordance with the present invention is shown producing a transmitter field 30 and projecting the transmitter field 30 through the formation 40.

Control equipment may be in communication with the downhole tool string components 36 through an electrically conductive medium. For example, a coaxial cable, wire, twisted pair of wires or combinations thereof may travel from the surface to at least one downhole tool string component 36. The downhole tool string components 36 may be in inductive or electrical communication with each other through couplers positioned so as to allow signal transmission across the connection of the downhole component 36 and the downhole tool string 31. The couplers may be disposed within recesses in either a primary or secondary shoulder of the connection or they may be disposed within inserts positioned within the bores of the drill bit assembly and the downhole tool string component 36. As the control equipment receives information indicating specific formation qualities, the control equipment may then change drilling parameters according to the data received to optimize drilling efficiency. Operation of the drill string 31 may include the ability to steer the direction of drilling based on the data either manually or automatically.

Figure 2:
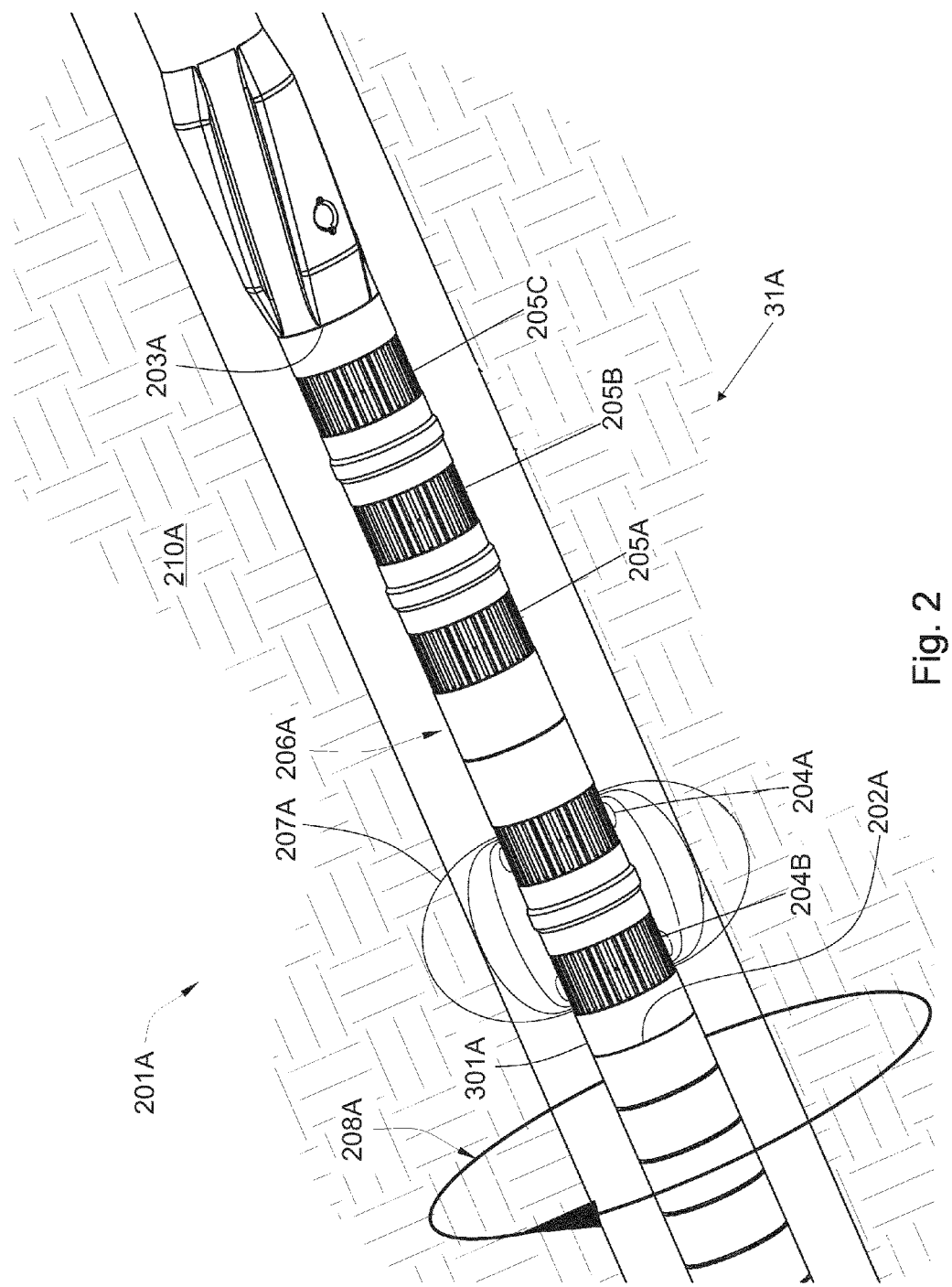
FIG. 2 is a cross-section view of a well hole showing a perspective diagram of an embodiment of an inductive resistivity tool.

Referring now to FIG. 2, an embodiment of an inductive resistivity tool 201A is shown as part of a downhole tool string 31A which may be stationary or rotate in a direction such as direction 208A. The resistivity tool 201A is shown between first and second tool joints 202A, 203A. A transmitter field 207A is shown being produced by two transmitters 204A, 204B, and being received by at least one of three receivers 205A, 205B, 205C.

The transmitter field 207A induces an electromagnetic field into the formation 210A, which in turn induces a received signal at at least one of the receivers 205A, 205B, 205C. By projecting the transmitter field 207A through the formation 210A and comparing the amplitude and phase of the received signal to that of a transmitted signal that caused the transmitter to produce the transmitter field 207A, the resistivity and other parameters of the formation 210A are determined. Because hydrocarbon and/or petroleum products in the formation 210A are typically non-conductive, resistivity measurements are used to determine the petroleum potential of the formation 210A during the drilling process.

The preferential projection of the transmitter field 207A away from the tool string 31A by the transmitters 204A, 204B allows the wall 301A of the downhole component 36A to include a magnetically and electrically conductive material. A single transmitter or a plurality of transmitters 204A, 204B as shown in FIG. 2, may be disposed on a single tool 201A. In embodiments such as FIG. 2 having a plurality of transmitters 204A, 204B, each transmitter 204A, 204B may be selectively energized. Although specific numbers of receivers 205A, 205B, 205C and transmitters 204A, 204B have been shown in the present embodiment, any combination of any number of receivers and transmitters is consistent with the present invention. A sleeve 206A may be disposed around the transmitters 204A, 204B and receivers 205A, 205B, 205C of the resistivity tool 201A to protect them from mud and/or debris.

In some embodiments the tool 201A may be incorporated into a drilling string, a tool string, a pushed coil tubing string, a wireline system, a cable system, or combinations thereof.

Figure 3:
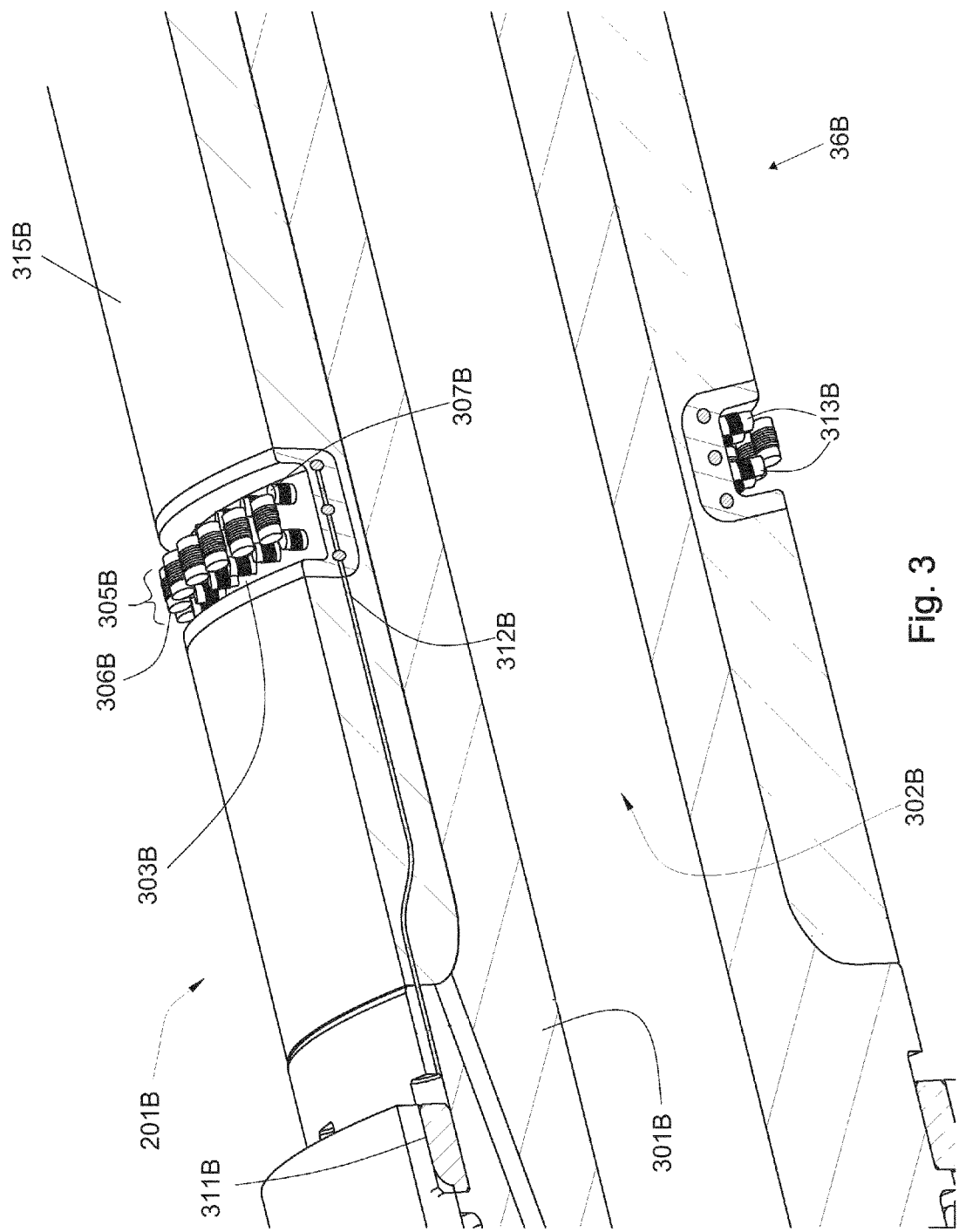
FIG. 3 is a cross-sectional diagram of an embodiment of an induction transmitter assembly in an inductive resistivity tool.

Referring now to FIG. 3, a cross sectional view of an embodiment of a portion of a resistivity tool 201B is shown without a protective sleeve, such as protective sleeve 206A of FIG. 2, and disposed in a downhole component 36B. The downhole component 36B has an outer wall 301B surrounding a central bore 302B through which drilling mud (not shown) may be transferred. The outer wall 301B has an annular radial recess 303A formed in its outer surface 315B. An induction transmitter assembly 305B is disposed within the radial recess 303B. The induction transmitter assembly 305B has a plurality of electromagnetic induction transmitter coils 306B which may also have adjacent directing bucking coils 313B. The transmitter coils 306B are each wound about at least one core 307B.

The transmitter assembly 305B may be mounted in any orientation and at any angle. It is further understood that the use of the term "coils" herein may be coils with individual windings or integral windings as part of the core 307B, a spiral, or the coil may be an antenna.

In embodiments of the invention where the coils 306B comprise individual or integral windings, a transmitter coil 306B may have between 1 and 1000 coil turns. A coil turn is understood as a discrete 360 degree disposition of the coil 306B about the core 307B. The transmitter coils 306B may each have any number of coil turns, spirals or other electrical pattern.

Each core 307B may have of a magnetically conductive material, such as ferrite. At least one core 307B includes an electrically insulating cylinder that is disposed around a dielectric material. In some embodiments of the invention, the transmitter assembly 305B may be a single transmitter coil 306B that is wound about a plurality of cores 307B.

When an electrical alternating current (AC) flows through the transmitter coil 306B, an I nduction signal is transmitted and then directed away from the transmitter coil 306B by the action of one or more bucking coil(s) 313B. The induction signal may be the transmitter field 207A of FIG. 2. The transmitter assembly 305B is adapted to create electromagnetic fields that originate the induction signal from outside the outer wall 301B and substantially prevent the induction signal from entering the outer wall 301B. This allows for the use of a magnetically conductive material in the outer wall 301B without interfering with the action of the resistivity tool 201B. Electrical current may be supplied to the transmitter assembly 305B via an electrically conductive medium 311B. Electrically conductive medium 311B may have a plurality of copper wires 312B, coaxial cable, twisted pairs of wire, or combinations thereof which may extend from electrically conductive medium 311B to locations throughout the transmitter assembly 305B.

Figure 4:
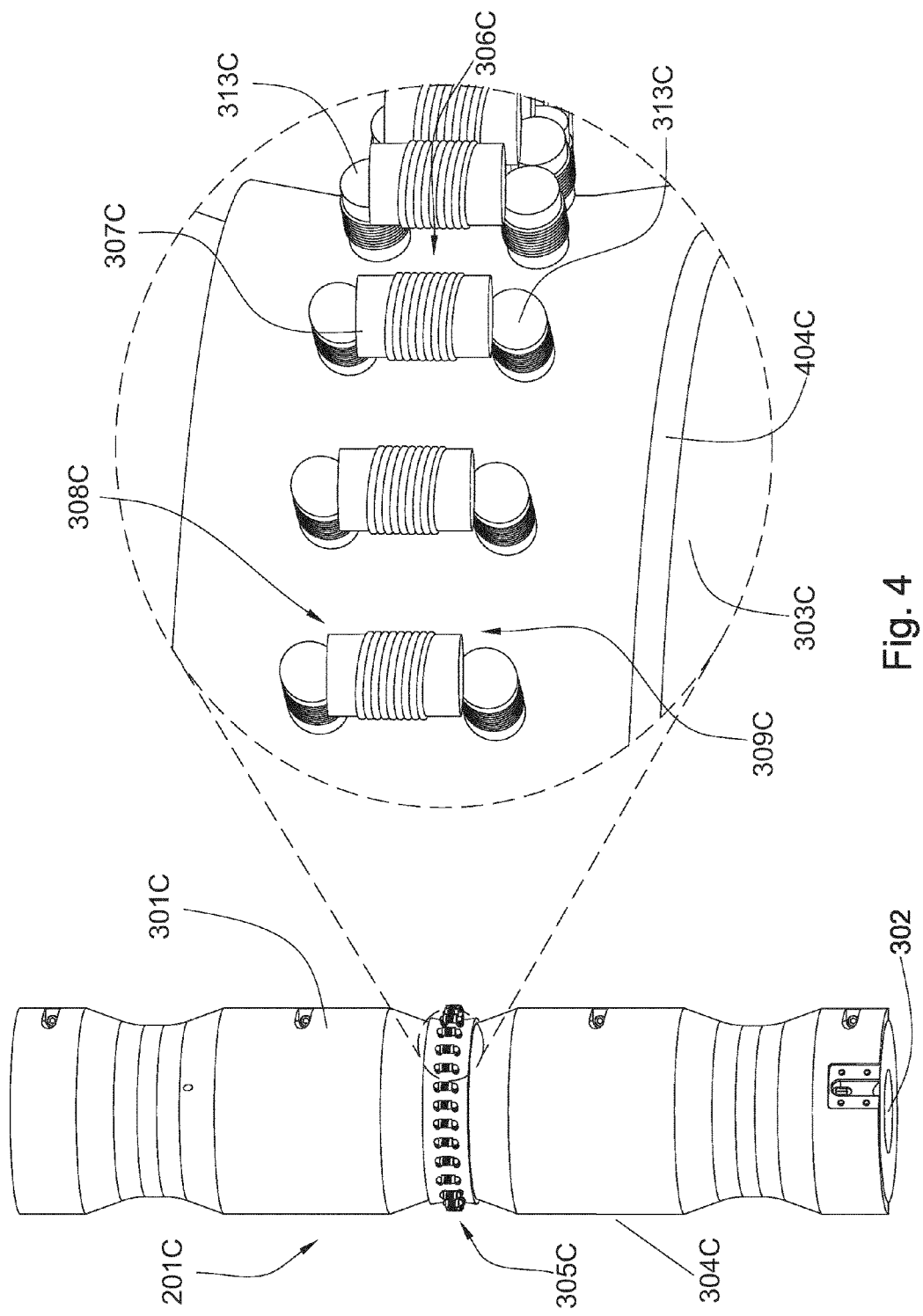
FIG. 4 is a perspective diagram of an embodiment of an induction transmitter assembly disposed in a radial recess including a close-up diagram of the induction transmitter assembly.

Referring now to FIG. 4, a perspective diagram of a resistivity tool 201C discloses an enlarged view of an embodiment of a transmitter assembly 305C. The transmitter assembly 305C comprises a plurality of transmitter coils 306C and bucking coils 313C disposed along an outer surface 304C and within a radial recess 303C. In the present embodiment, the transmitter assembly 305C circumferentially spans the outer surface 304C of the tool 201C. Each of the plurality of the transmitter coils 306C and bucking coils 313C is wound about at least one core 307C. The transmitter assembly 305C is separated from the bottom of radial recess 303C by a shield 404C which may be an insulator and/or magnetically conductive material such as ferrite. The magnetically conductive electrically insulating material may include ferrite fibers, shavings, powder, crystals, or combinations thereof. The transmitter coils 306C may have first and second ends 308C, 309C. At least one bucking coil 313C may be disposed adjacent each of the first and second ends 308C, 309C and the outer wall 301C.

Figure 5:
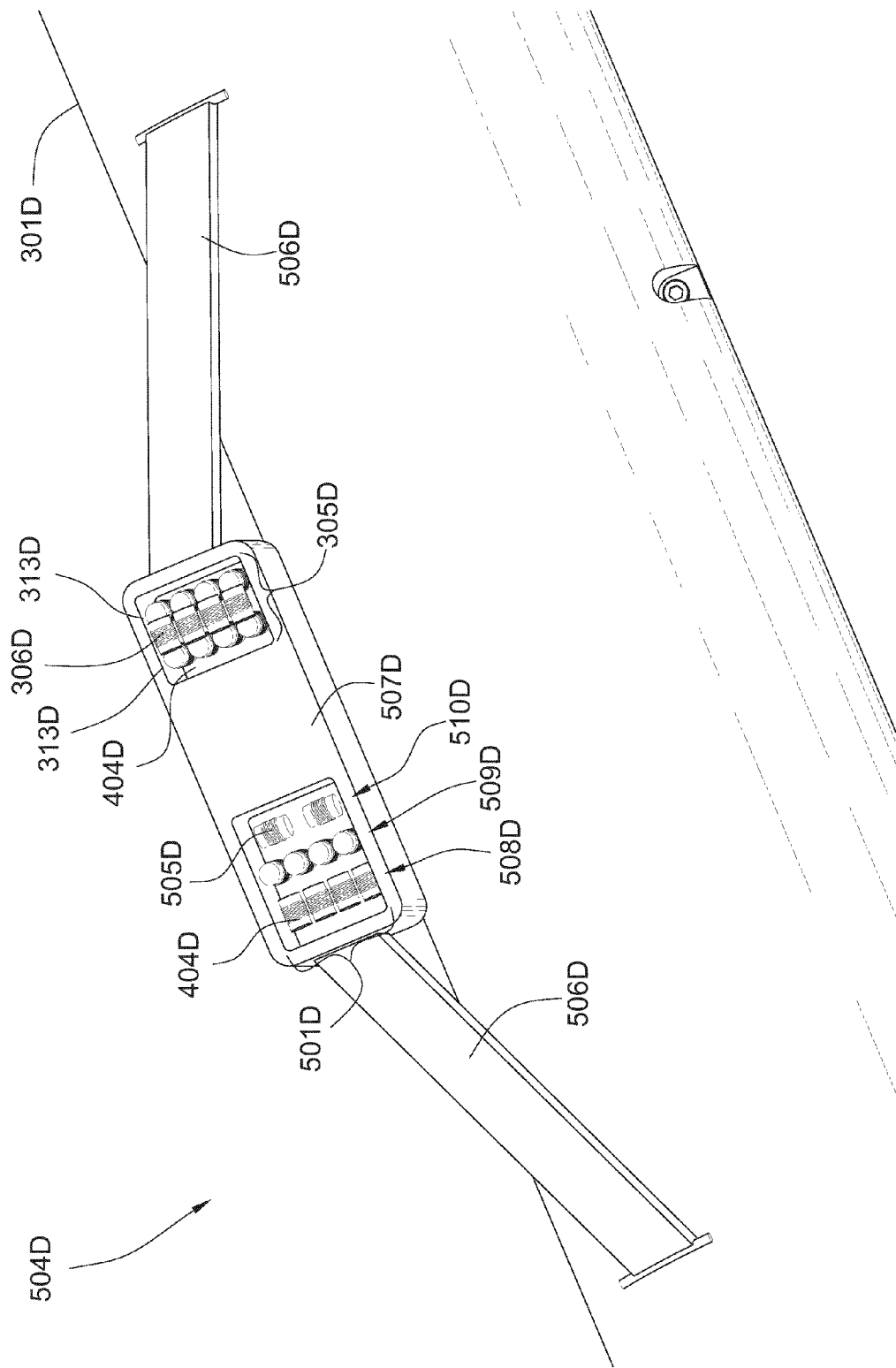
FIG. 5 is a perspective diagram of another embodiment of an induction transmitter assembly disposed on a padded arm on a downhole tool.

FIG. 5 discloses an embodiment of a padded inductive resistivity tool 504D. A transmitter assembly 305D and a receiver assembly 501D are each mounted on an outer extendable pad 507D connected to the outer wall 301D by an extendable arm assembly 506D. The transmitter assembly 305D is adapted to direct a transmitter field away from the pad 507D and into a selected portion of a formation, such as formation 40 of FIG. 1. The extendable arm assembly 506D may allow the transmitter assembly 305D to be disposed away from the outer wall 301D of tool 504D and proximate the formation. FIG. 5 also discloses a plurality of receiver coils 505D disposed on pad 507D. Each receiver coil 505D is wound about at least one core 307D.

In the embodiment of FIG. 5, the receiver coils 505D are mounted in first, second, and third rows 508D, 509D, 510D. Each of the rows 508D, 509D, 510D has receiver coils 505D in an orthogonal orientation to receiver coils 505D in both of the other rows 508D, 509D, 510D. Receiver assembly 501D having orthogonally oriented rows 508D, 509D, 510D of receiver coils 505D allows the receiver assembly 501D to detect anisotropic field effects that are useful in dipping beds or horizontal wells. As disclosed in FIG. 5, the first, second and third rows 508D, 509D, 510D may have a plurality of receiver coils 505D. Other combinations of numbers of receiver coils 505D in particular rows may be compatible with the present embodiment of the invention.

Figure 6:
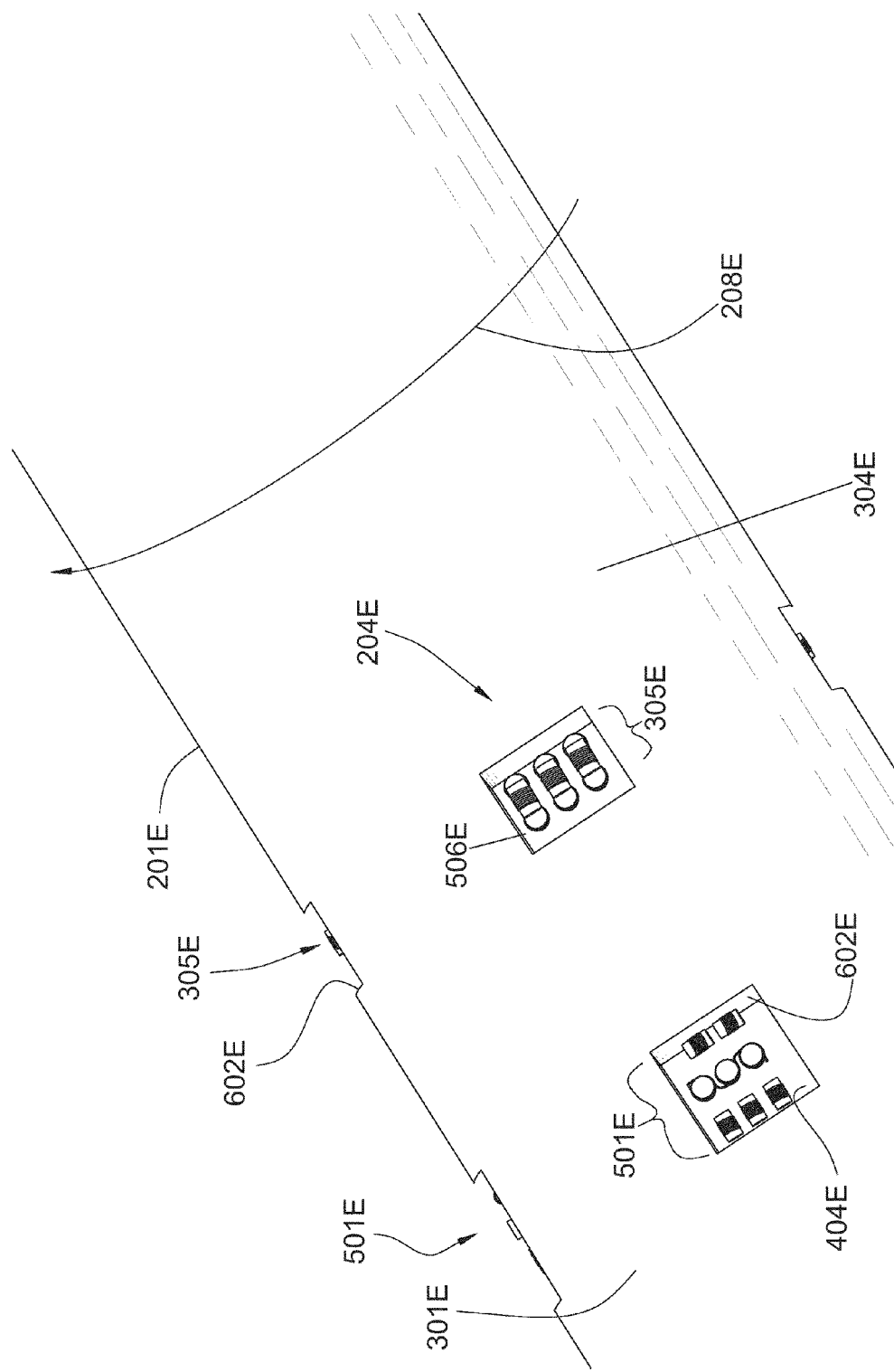
FIG. 6 is a perspective diagram of another embodiment of an induction transmitter assembly disposed in a radial recess used for angular radial investigation.

Referring now to FIG. 6, a plurality of transmitter and receivers assemblies 305E, 501E may be mounted in small radial recesses 602E in an outer wall 301E of a resistivity tool 201E. The transmitter assembly 305E and receiver assembly 501E are separated from the bottom of radial recesses 602E by a shield 404E. The transmitter and receiver assemblies 305E, 501E may be disposed circumferentially around the outer surface 304E of the tool 201E. The specific location of each transmitter and receiver assembly 305E, 501E may direct a field into a selected portion of a formation. As the downhole components and the induction resistivity tool 201E rotate axially as indicated by arrow 208E, the directed field may sweep through a continuous path of selected portions of a formation.

Open space in annular recesses 303E, 602E around transmitter and receiver assemblies 305E, 501E may be filled with a potting material and/or covered with a protective sleeve such as protective sleeve 206 of FIG. 2. The potting material may be a material selected from the group consisting of polymers, organic materials, thermoset polymers, vinyl, an aerogel composite, a synthetic binder, thermoplastic polymers, an epoxy, natural rubber, fiberglass, carbon fiber composite, polyurethane, silicon, a fluorinated polymer, grease, polytetrafluoroethylene, a perfluroroalkoxy compound, resin, soft iron, ferrite, a nickel alloy, a silicon iron alloy, a cobalt iron alloy, a mu-metal, a laminated mu-metal, barium, strontium, carbonate, samarium, cobalt, neodymium, boron, a metal oxide, ceramics, cermets, ceramic composites, rare earth metals, and combinations thereof.

Formations may have varying resistivity characteristics depending on their composition. These characteristics may require the use of different voltages or frequencies to obtain logging information. Changes in voltage or frequency may be facilitated by the ability to change adjacent coils 306E between parallel and series connections. In some embodiments of the invention a signal alteration component (not shown) such as a voltage controlled oscillator (VCO) may be disposed between a power source and the transmitter assembly 305E.

Figure 7:
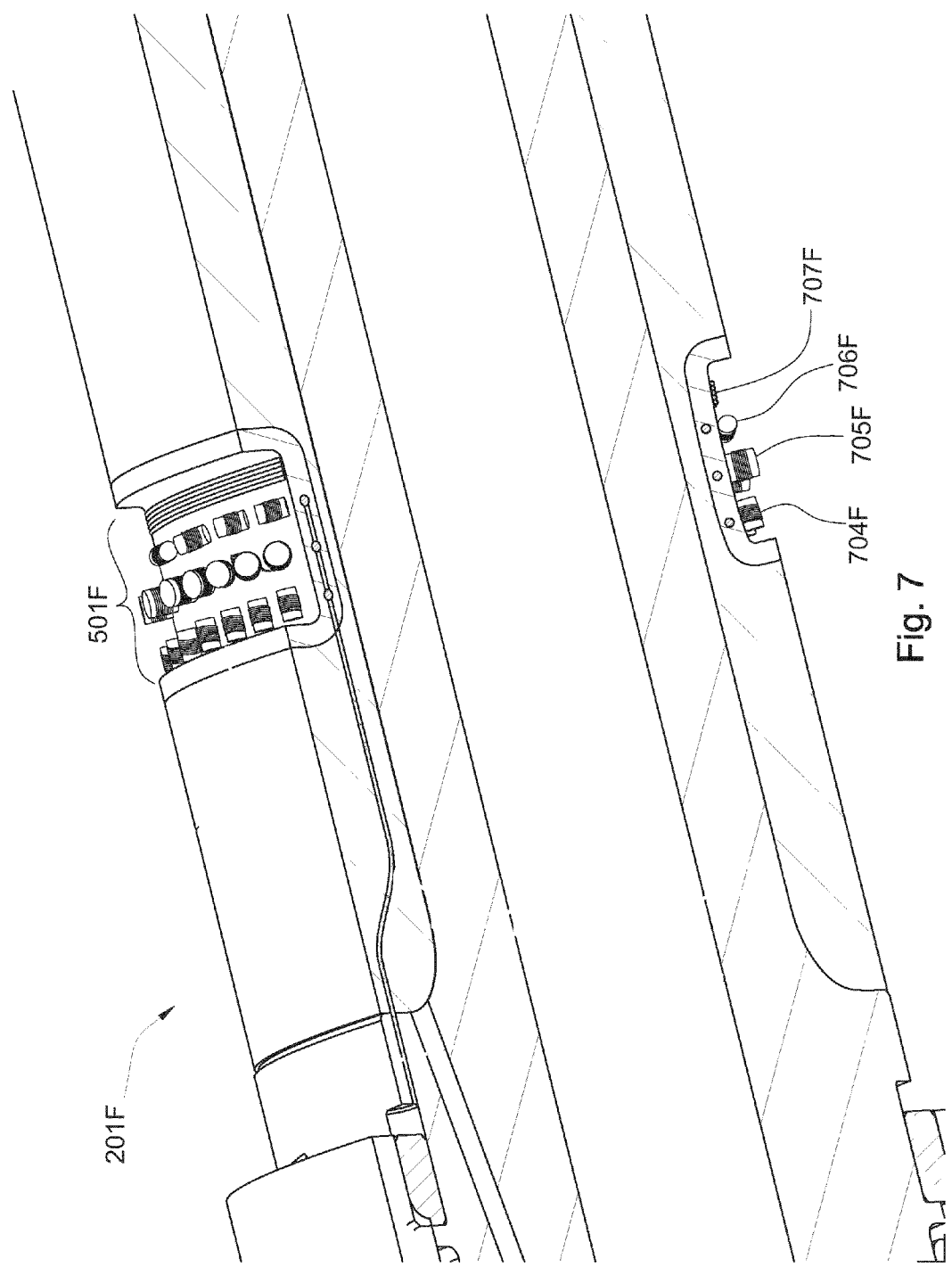
FIG. 7 is a cross-sectional diagram of an embodiment of an induction receiver assembly disposed in an annular radial recess.

FIG. 7 is a cross-sectional view of the induction tool 201F depicting another embodiment of a receiver assembly 501F.

The receiver assembly 501F has longitudinal receiver coils 704F, vertical receiver coils 705F, horizontal receiver coils 706F, circumferentially wrapped receiver coils 707F, or combinations thereof.

Figure 8:
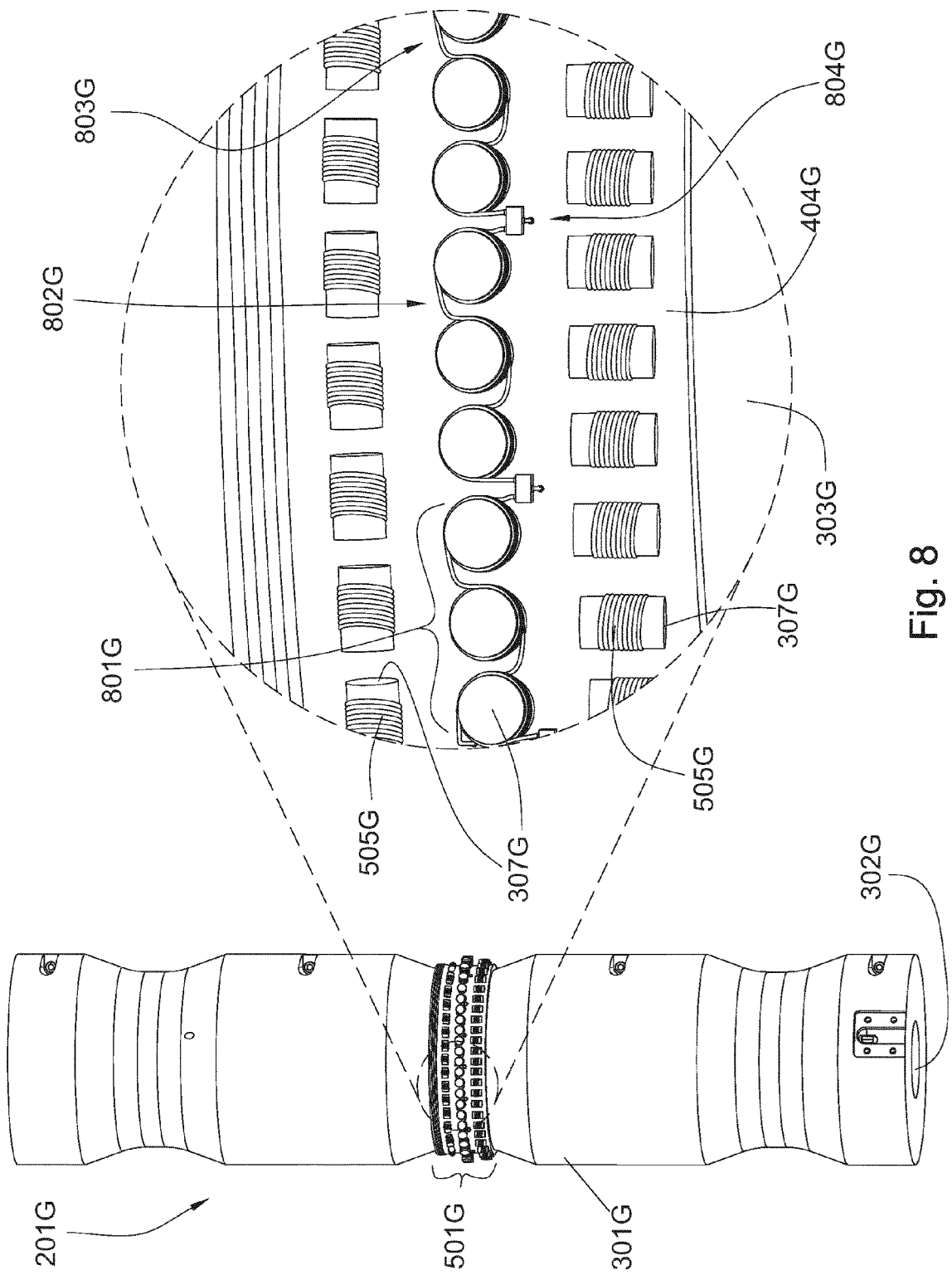
FIG. 8 is a perspective diagram of an embodiment of an induction receiver assembly disposed in an annular radial recesses including a close-up view of the induction receiver assembly.

Referring now to FIG. 8, a perspective diagram of a resistivity tool 201G discloses an enlarged view of an embodiment of a receiver assembly 501G in which a receiver induction coil 505G may be wound about a plurality of cores 307G. A shield 404G is disposed between the receiver assembly 501G and an outer surface of an outer wall 301G disposed in an annular recess 303G. The shield 404G may be an insulator and/or ferrite material. The coils 505G may have a core 307G of air, ferrite or another material.

Referring now to FIG. 8, a perspective diagram of a resistivity tool 201G discloses an enlarged view of an embodiment of a receiver assembly 501G in which a receiver induction coil 505G may be wound about a plurality of cores 307G. A shield 404G is disposed between the receiver assembly 501G and a-an outer surface of an outer wall 301G disposed in an annular recess 303G. The shield 404G may be an insulator and/or ferrite material. The coils 505G may have a core 307G of air, ferrite or another material.

Each of the induction coils 505G may be electrically parallel to one another. In some embodiments of the invention some of the induction coils 505G may be electrically connected in series. Parallel connections of induction coils 505G may be advantageous in embodiments where an inductance of the induction coil 505G would otherwise be so great that it would require a prohibitive amount of voltage or amperage to induce a transmitter field of desired strength.

In some embodiments, a plurality of the cores 307G may be wired together forming an induction segment 801G. These segments 801G may be selectively turned on and off to aid in taking complex measurements. As disclosed in FIG. 8, a first induction coil segment 802G may be adapted to switch between a series and parallel connection with a second induction coil segment 803G. This adaptation may be accomplished by connecting the first and second coils segments 802G, 803G via a connector switch 804G.

Referring now to FIGS. 9 and 10, FIG. 9 is a perspective view of the induction tool 201H and FIG. 10 is a cross section of the induction tool 201H taken along line 905. FIG. 9 discloses an embodiment of the invention in which the transmitter assembly 305H has two or more transmitter coils 306H which direct a transmitter field in orthogonal directions from other transmitter coils 306H in the assembly 305H. The orientation and construction of the transmitter coils 306H and a shield 404H generate a field that is directed preferentially toward the formation and minimizes the field in the material of the induction resistivity tool 201H.

The detailed cross-section in FIG. 10 discloses a method of using a core 307H to direct a coil generated field around the circumference of an annular recess 303H to minimize the interference caused by the tool material. The core 307H spans one half of a total circumference along an outer surface 301H. First and second ends 901, 902 of the core 307H are coaxial to one another. In some embodiments a core 307H may span at least one third of the total circumference. A transmitter coil 306H is wound about the first and second ends 901, 902 of the core 307H. The ends 901, 902 are each disposed orthogonally to the outer surface 301. The shield 404H is also utilized to further minimize and direct any residual field generated by the coil 306H.

What is claimed is:

1. An induction resistivity tool for incorporation into a downhole tool string, the induction resistivity tool comprising:
   a downhole component having an outer surface having a circumference;
   a plurality of induction transmitter assemblies disposed circumferentially about said outer surface, each of the induction transmitter assemblies spanning a distance less than one-half of said circumference, each transmitter assembly being adapted to conduct an alternating current and in response to conduction of said alternating current, project an induction signal outward from said outer surface, and each of the induction transmitter assemblies having:
   a plurality of cores; and,
   a plurality of transmitter coils, each transmitter coil corresponding to a core of said plurality of cores;

2. The induction resistivity tool of claim 1, wherein a location of said plurality of induction transmitter assemblies on the outer surface of the downhole component directs said induction signal into a selected portion of a formation.

3. The induction resistivity tool of claim 2, wherein the tool has a central axis and wherein the tool is adapted to rotate axially, sweeping a directed field through a continuous path of selected portions of the formation.

4. The induction resistivity tool of claim 1, where said plurality of induction transmitter assemblies are adapted to create electromagnetic fields that originate said induction signal from outside said outer surface and substantially prevent said induction signal from entering the outer surface.

5. The induction resistivity tool of claim 1, wherein said downhole component has a radial recess disposed in said outer surface and at least one of said plurality of induction transmitter assemblies is mounted in said radial recess.

6. The induction resistivity tool of claim 1, wherein at least one of the plurality of induction transmitter assemblies is adapted to switch between a series and parallel connection with at least one other induction transmitter assembly of the plurality of induction transmitter assemblies.

7. The induction resistivity tool of claim 1, wherein at least one of said plurality of transmitter assemblies is disposed circumferentially around the outer surface and spans less than one-third of a total circumference along the outer surface.

8. The induction resistivity tool of claim 1, wherein at least one of said plurality of transmitter assemblies is disposed circumferentially around the outer surface and spans less than one-quarter of a total circumference along the outer surface.

9. The induction resistivity tool of claim 1, wherein at least one of said plurality of transmitter assemblies has magnetically conductive and electrically insulating material disposed between at said at least one induction transmitter coil and said outer surface of the downhole component.

10. The induction resistivity tool of claim 1, wherein at least one of said plurality of transmitter coils has between 1 and 1000 coil turns.

11. The induction resistivity tool of claim 1, further comprising an arm assembly coupled to said outer surface and an extendable pad coupled to said arm assembly, said extendable pad extending away from said outer surface, wherein at least one of said plurality of transmitter assemblies is disposed on said extendable pad and extends towards said formation.

12. The induction resistivity tool of claim 1, wherein at least one of said plurality of cores is a magnetically conductive material.

13. The induction resistivity tool of claim 1, wherein at least one of said plurality of cores is an electrically insulating cylinder disposed around an air-filled region.

14. The induction resistivity tool of claim 1, wherein said plurality of transmitter assemblies generate a single induction signal.

15. The induction resistivity tool of claim 1, wherein said outer surface of said downhole component is a magnetically conductive material.

16. The induction resistivity tool of claim 1, further comprising at least one induction receiver assembly disposed about said outer surface and said induction receiver assembly including at least one receiver coil wound about at least one core.

17. A downhole component comprising:
a body having an axis, an outer wall and a bore, said outer wall defining an inner surface of said bore and an outer surface, said body configured to rotate about said axis;
a recess formed in said outer wall at said outer surface;
an induction transmitter assembly disposed within said recess, said induction transmitter assembly including a plurality of transmitter coils, said induction transmitter assembly adapted to generate an induction signal outside said outer wall, project said induction signal outward from said outer wall, and substantially prevent said induction signal from entering said outer wall.

18. The downhole component of claim 17, wherein said induction transmitter assembly has one or more bucking coils, said bucking coils directing said induction signal away from said induction transmitter assembly.

* * * * *